(12) United States Patent
Jung et al.

(10) Patent No.: US 12,545,979 B2
(45) Date of Patent: Feb. 10, 2026

(54) ALUMINUM-BASED ALLOY-COATED STEEL SHEET AND METHOD OF MANUFACTURING SAME

(71) Applicant: POSCO, Pohang-si (KR)

(72) Inventors: Woo-Sung Jung, Gwangyang-si (KR); Sang-Hoon Park, Gwangyang-si (KR); Suk-Kyu Lee, Gwangyang-si (KR)

(73) Assignee: POSCO, Pohang-si (KR)

( * ) Notice: Subject to any disclaimer, the term of this patent is extended or adjusted under 35 U.S.C. 154(b) by 720 days.

(21) Appl. No.: 17/781,969

(22) PCT Filed: Dec. 1, 2020

(86) PCT No.: PCT/KR2020/017347
§ 371 (c)(1),
(2) Date: Jun. 2, 2022

(87) PCT Pub. No.: WO2021/112521
PCT Pub. Date: Jun. 10, 2021

(65) Prior Publication Data
US 2023/0019519 A1    Jan. 19, 2023

(30) Foreign Application Priority Data
Dec. 5, 2019 (KR) .......................... 10-2019-0160730

(51) Int. Cl.
*C22C 21/10* (2006.01)
*C23C 14/16* (2006.01)
(Continued)

(52) U.S. Cl.
CPC .............. *C22C 21/10* (2013.01); *C23C 14/16* (2013.01); *C23C 14/24* (2013.01); *C23C 28/3225* (2013.01)

(58) Field of Classification Search
CPC ..... B32B 15/012; B32B 15/017; C23C 28/02; C23C 28/3225
See application file for complete search history.

(56) References Cited

U.S. PATENT DOCUMENTS

| 5,429,843 A | 7/1995 | Masaki et al. |
| 2010/0294400 A1 | 11/2010 | Lupp et al. |

(Continued)

FOREIGN PATENT DOCUMENTS

| CN | 103805930 A | 5/2014 |
| CN | 107250414 A | 10/2017 |

(Continued)

OTHER PUBLICATIONS

International Search Report dated Mar. 9, 2021 issued in International Patent Application No. PCT/KR2020/017347 (with English translation).

(Continued)

*Primary Examiner* — Jessee R Roe
(74) *Attorney, Agent, or Firm* — Morgan Lewis & Bockius LLP

(57) ABSTRACT

The present disclosure relates to an aluminum-based alloy-coated steel sheet and a method of manufacturing the same and, more particularly, to an aluminum-based alloy-coated steel sheet that can be preferably applied to automotive steel sheets, etc., and a method of manufacturing the same.

An embodiment of the present disclosure provides an aluminum-based alloy-coated steel sheet that includes: a base steel sheet; an Al-based alloy-coated layer formed on at least one surface of the base steel sheet; and a Zn—Al-based coated layer formed on the Al-based alloy-coated layer, including Al: 0.5~1.0%, and a balance of Zn and unavoidable impurities in percentage by weight, and having an (Continued)

adhesion amount of 3~12 g/m², and a method of manufacturing the aluminum-based alloy-coated steel sheet.

3 Claims, 3 Drawing Sheets

(51) Int. Cl.
*C23C 14/24* (2006.01)
*C23C 28/00* (2006.01)

(56) References Cited

U.S. PATENT DOCUMENTS

| | | |
|---|---|---|
| 2011/0274945 A1 | 11/2011 | Shimoda et al. |
| 2018/0044774 A1 | 2/2018 | Allely et al. |
| 2018/0237900 A1 | 8/2018 | Kobayashi et al. |
| 2019/0194792 A1 | 6/2019 | Kim et al. |
| 2020/0262181 A1 | 8/2020 | Kim et al. |

FOREIGN PATENT DOCUMENTS

| | | |
|---|---|---|
| CN | 108138308 A | 6/2018 |
| CN | 108431269 A | 8/2018 |
| EP | 2045360 A1 | 4/2009 |
| JP | 2005-154856 A | 6/2005 |
| JP | 2018-090879 A | 6/2018 |
| KR | 10-1997-0011012 A | 3/1997 |
| KR | 10-0146986 B1 | 5/1998 |
| KR | 10-0711446 B1 | 4/2007 |
| KR | 10-2016-0027319 A | 3/2016 |
| KR | 10-2017-0116102 A | 10/2017 |
| KR | 10-1786377 B1 | 10/2017 |
| KR | 10-2019-0076796 A | 7/2019 |
| WO | 2019/043424 A1 | 3/2019 |

OTHER PUBLICATIONS

Miao Qiang et al., Northwestern Polytechnical University Press, Nonferrous Materials Science, Aug. 31, 2016, p. 227.
Chinese Office Action dated Mar. 18, 2023, issued in corresponding Chinese Patent Application No. 202080084007.X.
Extended European Search Report dated Sep. 16, 2022 issued in European Patent Application No. 20897197.8.

[FIG. 1]
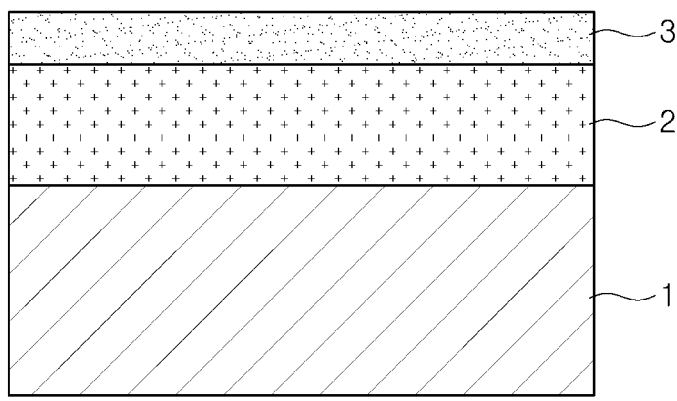
[FIG. 2]
| ITEMS | Zn COATING | Zn-1wt%Al |
|---|---|---|
| SURFACE OF COATED LAYER (X 20,000) | | |
| HARDNESS OF COATED LAYER (Hv) | 52 | 85 |

[FIG. 3]

| ITEMS | REFERENCE EXAMPLE (GI) | COMPARATIVE EXAMPLE 1 | INVENTIVE EXAMPLE 1 |
|---|---|---|---|
| AFTER PHOSPHATING (SURFACE, X700) | | | |
| AFTER PHOSPHATING (SURFACE, X10,000) | | ALMOST NOT GROWTH OF PHOSPHATE GRAIN | PHOSPHATE COVERAGE, GRAIN SIZE, ETC. SIMILAR TO GI |
| ITEMS | INVENTIVE EXAMPLE 2 | COMPARATIVE EXAMPLE 5 | INVENTIVE EXAMPLE 4 |
| AFTER PHOSPHATING (SURFACE, X700) | | | |
| AFTER PHOSPHATING (SURFACE, X10,000) | PHOSPHATE COVERAGE, GRAIN SIZE, ETC. SIMILAR TO GI | ALMOST NOT GROWTH OF PHOSPHATE GRAIN | PHOSPHATE COVERAGE, GRAIN SIZE, ETC. SIMILAR TO GI |

[FIG. 4]
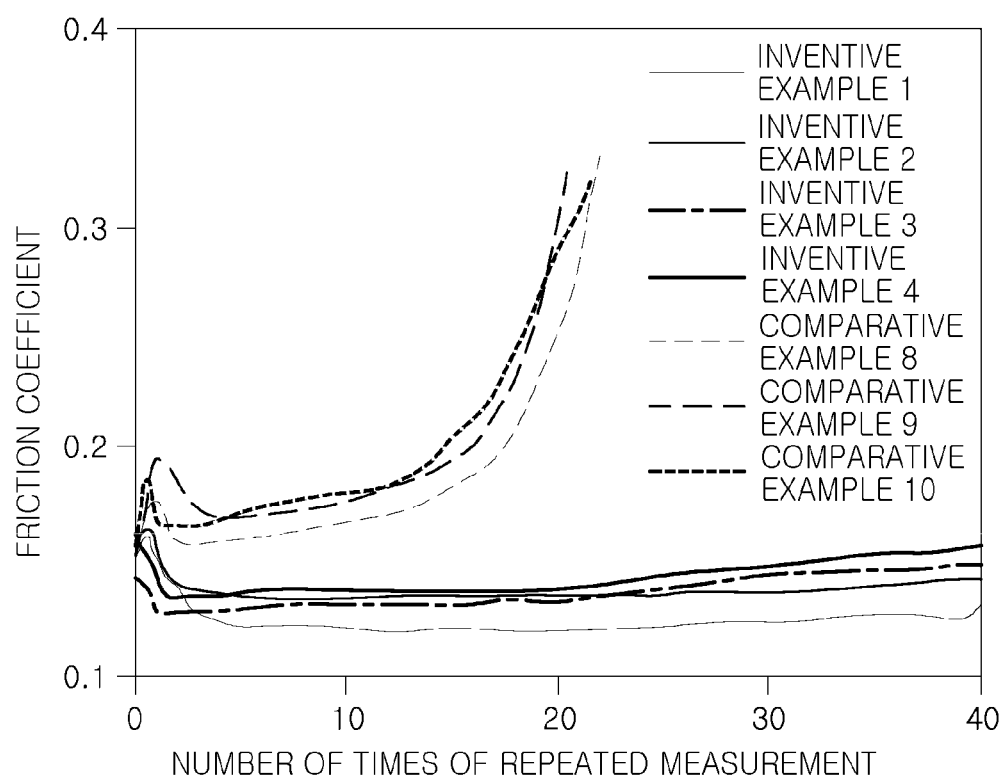

ALUMINUM-BASED ALLOY-COATED STEEL SHEET AND METHOD OF MANUFACTURING SAME

CROSS-REFERENCE OF RELATED APPLICATIONS

This application is the U.S. National Phase under 35 U.S.C. § 371 of International Patent Application No. PCT/KR2020/017347, filed on Dec. 1, 2020, which in turn claims the benefit of Korean Application No. 10-2019-0160730, filed on Dec. 5, 2019, the entire disclosures of which applications are incorporated by reference herein.

TECHNICAL FIELD

The present disclosure relates to an aluminum-based alloy-coated steel sheet and a method of manufacturing the same and, more particularly, to an aluminum-based alloy-coated steel sheet that can be preferably applied to automotive steel sheets, etc., and a method of manufacturing the same.

BACKGROUND ART

Aluminum-coated and aluminum alloy-coated steel sheets have been used in various industrial fields due to various advantages of such zinc-coated and zinc ally-coated steel sheets. In particular, when various high-strength steels that have been recently developed are coated with an aluminum alloy, liquid metal embrittlement that is generated in spot welding may not be generated, and sacrificial protection and coating adhesion can be secured, so that interest in aluminum alloy coating is gradually increasing.

Defects of aluminum-based coated steel sheets have been continuously improved and compensated through alloying with various elements, but a most part of a coated layer is composed of aluminum, so there is a limitation that zinc-based post processing that is most commonly used by existing car companies is fundamentally impossible. According to phosphating that is the most representative, a film is formed by substitution of zinc for phosphate, but, according to aluminum alloy coating, zinc that can react with a phosphate solution does not exist or is insufficient, so a phosphate film is not normally formed. Accordingly, in order to apply an aluminum alloy-coated steel sheet to vehicles, the aluminum alloy-coated steel sheet should be used after phosphating for aluminum coating is performed in a specific line independent from a vehicle manufacturing line, or it is necessary to replace all of existing zinc-based phosphating solutions with a solution for aluminum. Accordingly, there is a problem that specific processing is needed, continuous production is impossible, and manufacturing costs and time are greatly increased due to a change of the solutions.

Accordingly, even though aluminum alloy-coated steel sheets can solve the chronic problems of existing zinc-based coated steel sheets and have various advantages, the application thereof is very limited, for example, the aluminum alloy-coated steel sheets are used only for some structural interior materials that do not require post processing due to an increase in manufacturing costs of car companies.

In order to overcome this problem, an improving plan of coating the surface of an Al-coated steel sheet with Zn through PVD has been proposed in Patent Document 1. However, according to the technique proposed in Patent Document 1, scratch resistance is deteriorated due to high ductility of the coated Zn, so many scratches are formed on the surface of coated steel sheets in forming such as pressing. Further, since there is a new problem that a mold is considerably contaminated due to low friction coefficient and galling resistance, so actual application is limited.

RELATED ART DOCUMENT (Patent Document 1) Korean Patent Application Publication No. 1995-0027278

DISCLOSURE

Technical Problem

An aspect of the present disclosure is to provide an automotive aluminum-based alloy-coated steel sheet that can receive zinc-based post processing, which is generally performed by car companies, that does not generate liquid metal embrittlement (LME) in a welded portion, and that also has excellent galling resistance, and a method of manufacturing the aluminum-based alloy-coated steel sheet.

The objectives of the present disclosure are not limited to that described above. Those skilled in the art may understand additional objectives of the present disclosure without difficulty from the general contents in the specification.

Technical Solution

An embodiment of the present disclosure provides an aluminum-based alloy-coated steel sheet including: a base steel sheet; an Al-based alloy-coated layer formed on at least one surface of the base steel sheet; and a Zn—Al-based coated layer, formed on the Al-based alloy-coated layer, including Al: 0.5~1.0%, and a balance of Zn and unavoidable impurities in percentage by weight, and having an adhesion amount of 3~12 $g/m^2$.

Another embodiment of the present disclosure provides a method of manufacturing an aluminum-based alloy-coated steel sheet, the method including: preparing a base steel sheet; obtaining an aluminum alloy-coated steel sheet by forming an Al-based alloy-coated layer on the base steel sheet using hot dip aluminum coating; and forming a Zn—Al-based coated layer including g Al: 0.5~1.0%, and a balance of Zn and unavoidable impurities in percentage by weight and having an adhesion amount of 3~12 $g/m^2$ on a surface of the aluminum alloy-coated steel sheet using vacuum deposition.

Advantageous Effects

According to an aspect of the present disclosure, it is possible to provide an automotive aluminum-based alloy-coated steel sheet that does not generate liquid metal embrittlement in welded portions in not only common types of steel, but ultra-high strength types of steel, that can receive phosphating and post processing in the same manner as existing Zn-coated steel sheets, and particularly, that has excellent galling resistance because the hardness of a coated layer is 65 Hv or more in Vickers hardness.

Various and useful advantages and effects of the present disclosure are not limited to those described above and may be more easily understood in the process of describing detailed embodiments of the present disclosure.

BRIEF DESCRIPTION OF THE DRAWINGS

FIG. 1 is a view schematically illustrating a coating layer structure of an aluminum-based alloy-coated steel sheet according to a preferred embodiment of the present disclosure.

FIG. 2 is an image obtained by observing the surfaces of a Zn coating and a Zn-1 wt % Al alloy coating manufactured by vacuum deposition using a scanning electron microscope (SEM), and the result of measuring Vickers hardness.

FIG. 3 is an image obtained by observing surfaces after phosphating in comparative examples 1 and 5 and inventive examples 1, 2, and 4 according to an embodiment of the present disclosure using a scanning electron microscope (SEM).

FIG. 4 shows the result of measuring friction coefficients according to the numbers of times of repeated measurement in inventive examples 1 to 4 and comparative examples 8 to 10 according to an embodiment of the present disclosure.

BEST MODE

Terminologies used herein are provide to describe specific embodiments and are not intended to limit the present invention. Singular forms used herein include plural forms unless the context clearly indicates otherwise.

The term "include" used herein specifies the presence of stated features, regions, integers, steps, operations, elements and/or components, but does not preclude the presence or addition of other features, regions, integers, steps, operations, elements, and/or components.

Though not differently defined, all of terminologies including technical terminologies and scientific terminologies used herein have the same meanings as those that those skilled in the art would generally understand. Terminologies defined in common dictionaries are additionally construed as having meanings corresponding to related art documents and those described herein, and are not construed ideally or very officially unless defined.

The inventors have studied a plan for securing excellent machinability while securing a phosphating property of an aluminum-coated steel sheet. As a result, the inventors newly found that it is possible to perform the phosphating and post processing as existing Zn-coated steel sheet and to secure excellent corrosion resistance and galling resistance by forming a Zn-coated layer on an existing Al-based coated layer with the coating amount appropriately limited, and by increasing hardness of the Zn-coated layer over 65 Hv by adding an appropriate amount of Al to the Zn-coated layer, and accomplished the invention on the basis of this fact.

Hereafter, an aluminum-based alloy-coated steel sheet according to an aspect of the present disclosure is described in detail. It should be noted that when the content of each element is described, it means percentage by weight unless specifically defined in the present disclosure. Further, the ratio of crystals or structures is based on an area unless specifically stated.

FIG. 1 is a view schematically illustrating a coating layer structure of an aluminum-based alloy-coated steel sheet according to a preferred embodiment of the present disclosure. Referring to FIG. 1, an aluminum-based alloy-coated steel sheet of the present disclosure may include: a base steel sheet 1; an Al-based alloy-coated layer 2 formed on at least one surface of the base steel sheet 1; and an Zn—Al-based coated layer 3 formed on the Al-based alloy-coated layer 2.

The kind of the base steel sheet may not be specifically limited. The base steel sheet may be a Fe-based base steel sheet that is used at the base steel sheet of a common galvanized steel sheet, that is, may be a hot-rolled steel sheet or a cold-rolled steel sheet, but is not limited thereto. Further, the base steel sheet, for example, may be carbon steel, ultra-low carbon steel, or high manganese steel that is used as the material of vehicles, but is not limited thereto. In particular, preferably, high-strength and ultra-high strength steel such as DP, TRIP, TWIP, and MART that are used for automotive structures of tensile strength of 800 MPa or more at which liquid metal embrittlement is easily generated in spot welding may be used, but the base steel sheet is not limited thereto.

An Al-based alloy-coated layer may be formed on at least one surface of the base steel sheet. In detail, the Al-based alloy-coated layer may be formed on only one surface of the base steel sheet or may be formed on both surfaces of the base steel sheet.

The Al-based alloy-coated layer may be made of an aluminum-based alloy. The aluminum-based alloy may be defined in the present disclosure as an alloy including aluminum as the main constituent and including a small amount of alloy elements and unavoidable impurities. Since aluminum-based alloy layers that are generally used for automotive steel sheets in the art can be preferably applied as the Al-based alloy-coated layer of the present disclosure, the aluminum-based alloy constituting the Al-based alloy-coated layer may not be specifically limited. However, for example, the aluminum-based alloy-coated layer may include Si: 5~12%, Zn: 5~30%, Mg: 0.5~5%, Mn: 0.01~2%, Fe: 0.1~2%, and Al and unavoidable impurities as the balance in percentage by weight, but is not limited thereto.

A Zn—Al-based coated layer may be formed on the Al-based alloy-coated layer. The Zn—Al-based coated layer may include, in percentage by weight, Al: 0.5~1.0%, and a balance of Zn and unavoidable impurities, but including other ally elements is not excluded.

When a Zn—Al-based coated layer having a predetermined thickness or more is formed, various types of phosphating and post processing may be possible like existing Zn-coated steel sheets. However, as pointed out as a problems of the related art, when a Zn—Al-based coated layer is formed, galling resistance is rapidly deteriorated by the ductility of Zn (at a level of Vickers hardness 52~55 Hv), so the coated layer delaminates. Alternatively, productivity is decreased by an increase of the period of cleaning a mold, so manufacturing costs increase. Accordingly, the Zn—Al-based coated layer may be limited in use for automotive coated steel sheets. In order to solve this technical problem of the related art, it is possible to secure hardness at a predetermined level or higher by making the Zn—Al-based coated layer contain Al of 0.5~1.0% in the present disclosure. Such an increase of hardness is based on solid solution strengthening and grain refinement according to a small amount of alloying. FIG. 2 is an image obtained by observing the surfaces of a Zn coating and a Zn-1 wt % Al alloy coating manufactured by vacuum deposition, and the result of measuring Vickers hardness. As can be seen from FIG. 2, when Al of 1.0% was added to Zn—Al-based coated layer, the average grain size decreased half or less in comparison to pure Zn coating, and the hardness value was greatly increased up to 85 Hv in accordance with the strengthening principle described above.

When the content of Al included in the Zn—Al-based coated layer is less than 0.5%, it may be difficult to secure hardness of 65 Hv or more on the basis of Vickers hardness. However, when the content of Al exceeds 1.0%, it is possible to secure hardness of 65 Hv or more, so excellent galling resistance can be obtained, but there may be a problem that an abnormal phosphate film may be formed in phosphating in the following process. Accordingly, it is preferable that the content of Al included in the Zn—Al-based coated layer has the range of 0.5~1.2%. The lower limit of the content of Al is preferably 0.6%, more preferably 0.7%, and the most preferably 0.8%. The upper limit of the content of Al is preferably 1.1%, more preferably 1.0%, and the most preferably 0.9%.

The coating adhesion amount of the Zn—Al-based coated layer may be 3~12 g/m$^2$. In order to form a dense and stably phosphate layer and secure excellent adhesion force to a structural sealer in phosphating of the following process, the Zn—Al-based coated layer is required to have a coating adhesion amount of 3 g/m$^2$ or more. If the coating adhesion amount is less than the above value, it may be difficult to form a normal phosphate film in phosphating that is performed in the following process. However, when the coating adhesion amount exceeds 12 g/m$^2$, phosphating may be good, but the amount of Zn existing in a liquid state increases during spot welding, so liquid metal embrittlement (LME) may be generated at welding portions by Zn and the manufacturing cost is increased due to an increase of an unnecessary coating adhesion amount. Accordingly, it is preferable that the coating adhesion amount of the Zn—Al-based coated layer has the range of 3~12 g/m$^2$. The lower limit of the coating adhesion amount of the Zn—Al-based coated layer is preferably 4 g/m$^2$, more preferably 5 g/m$^2$, and the most preferably 6 g/m$^2$. The upper limit of the coating adhesion amount of the Zn—Al-based coated layer is preferably 11 g/m$^2$, more preferably 10 g/m$^2$, and the most preferably 9 g/m$^2$.

The hardness of the Zn—Al-based coated layer may be 65 Hv in Vickers hardness. Unlike a Zn-coated layer showing high ductility in the related art, hardness at a predetermined level or more is secured by adding Al, so excellent workability can be achieved.

Next, a method of manufacturing an aluminum-based alloy-coated steel sheet according to another aspect of the present disclosure is described in detail. However, the manufacturing method to be described hereafter is only one embodiment of all available embodiments and it is not meant that the aluminum-based alloy-coated steel sheet of the present disclosure should be made of the following manufacturing method.

First, a base steel sheet is prepared and an Al-based alloy-coated layer is formed on the base steel sheet through hot dip aluminum coating, whereby aluminum alloy-coated steel sheet is manufactured.

Hot dip aluminum coating may be not specifically limited, and hot dip aluminum coating that is generally used may be applied. For example, the base steel sheet includes, in percentage by weight, Zn of 5~30%, Mg of 0.5~5%, Mn of 0.01~3%, and Al and unavoidable impurities as the balance, and an Al-based alloy-coated layer can be formed by dipping the base steel sheet in a plating bath maintained at a plating bath temperature of 520~560° C.

Thereafter, a Zn—Al-based coated layer including Al: 0.5~1.0%, and a balance of Zn and unavoidable impurities in percentage by weight and having an adhesion amount of 3~12 g/m$^2$ is formed on the surface of the coated steel sheet having the Al-based alloy-coated layer. The method of forming the Zn—Al-based coated layer may not be specifically limited. However, since hot dip coating was applied already when forming the Al-based alloy-coated layer, it is preferable to use vacuum deposition, considering that it is difficult to apply again hot dip coating when forming the Zn—Al-based coated layer and a small amount of Al should be further included other than Zn, a thin layer with an adhesion amount of 3~12 g/m$^2$ should be formed. In particular, it is possible to apply EML-PVD, Jet-PVD, EB PVD, and other thermal types that can secure high productivity, but the present disclosure is not limited thereto.

MODE FOR INVENTION

Hereafter, the present disclosure is described in more detail through embodiments. However, it should be noted that the following embodiments are provided only to concrete the present disclosure through exemplification rather than limiting the right range of the present disclosure. This is because the right range of the present disclosure is determined the matters described in claims and matters reasonably inferred from the matters.

Embodiment

First, an ultra-high strength base steel sheet having tensile strength at a level of 1.2 GPa and having an alloy composition of C: 0.16%, Mn: 2.5%, Si: 1.5%, and Fe and unavoidable impurities as the balance in percentage by weight was prepared, and an Al-based alloy-coated layer was formed on the base steel sheet using hot dip coating. As the result of measuring the constituents of the Al-based alloy-coated layer through wet analysis (ICP), it was found that the Al-based alloy-coated layer contained Zn: 20%, Mg: 3%, Mn: 2%, Si: 7%, Fe: 0.9%, and Al as the balance. Thereafter, a Zn—Al-based coated layer was formed on the Al-based alloy-coated layer using EML-PVD. As shown in the following Table 1, the coating adhesion amount and the content of Al of the Zn—Al-based coated layer were changed.

A property test was performed in accordance with the following method on coated steel sheets manufactured in accordance with the method described above and the result was shown in the following Table 1.

The hardness of the Zn—Al-based coated layer was measured using a micro hardness tester. As for the measurement conditions, load was 5 mN, a load travel time was 10 seconds, and the maximum analysis depth was 10% thickness of the coated layer, and an average value was obtained after measurement in each embodiment.

Galling resistance was measured in a continuous friction coefficient measurement type and was measured 40 times under load of 5 MPa at a speed of 200 mm/s after cleansing oil is applied, and friction coefficients were classified into 'good' when they were less than 0.3 and 'poor' when they were 0.3 or more for 40 times of measurement.

As for a phosphate solution and processing conditions, dipping in a zinc-based phosphating solution for the same rust inhibitor and primer that is used phosphating of a GI-coated steel sheet by car companies was performed at 87~95° C. for 10~45 minutes. The phosphating properties were evaluated as 'good' when a surface status similar to existing GI-coated steel sheets after phosphating was shown, and was evaluated as 'poor' when phosphating was insufficient.

Whether liquid metal embrittlement was generated or not at welded portions was determined on the basis of whether cracks were observed by welding four pairs of specimens at a maximum welding current of −0.2 and −0.4 kA, respectively, through SEP1220 and observing welded cross-sections at 15 magnifications.

TABLE 1

| Items | Zn—Al-based coated layer | | | | | |
|---|---|---|---|---|---|---|
| | Coating amount (g/m2) | Content of Al (percentage by weight) | Hardness (Hv) | Galling resistance | Phosphating property | LME |
| Inventive example 1 | 3 | 0.5 | 78 | good | good | Not generated |
| Inventive example 2 | 6 | 0.5 | 75 | good | good | Not generated |
| Inventive example 3 | 9 | 0.5 | 77 | good | good | Not generated |
| Inventive example 4 | 12 | 0.5 | 75 | good | good | Not generated |
| Inventive example 5 | 3 | 1.0 | 87 | good | good | Not generated |
| Inventive example 6 | 6 | 1.0 | 86 | good | good | Not generated |
| Inventive example 7 | 9 | 1.0 | 86 | good | good | Not generated |
| Inventive example 8 | 12 | 1.0 | 85 | good | good | Not generated |
| Comparative example 1 | 1 | 0.5 | 88 | good | poor | Not generated |
| Comparative example 2 | 1 | 1.0 | 92 | good | poor | Not generated |
| Comparative example 3 | 3 | 1.5 | 95 | good | poor | Not generated |
| Comparative example 4 | 6 | 1.5 | 93 | good | poor | Not generated |
| Comparative example 5 | 9 | 1.5 | 91 | good | poor | Not generated |
| Comparative example 6 | 12 | 1.5 | 92 | good | poor | Not generated |
| Comparative example 7 | 3 | 0.1 | 55 | poor | good | Not generated |
| Comparative example 8 | 6 | 0.1 | 54 | poor | good | Not generated |
| Comparative example 9 | 9 | 0.1 | 52 | poor | good | Not generated |
| Comparative example 10 | 12 | 0.1 | 52 | poor | good | Not generated |
| Comparative example 11 | 15 | 0.5 | 74 | good | good | Generated |
| Comparative example 12 | 15 | 1.0 | 85 | good | good | Generated |

As can be seen from Table 1, in the inventive examples 1 to 8 in which the Zn—Al-based coated layer contains Al of 0.5~1.0% and the coating adhesion amount satisfied 3~12 g/m², hardness of the Zn—Al-based coated layer at least 65 Hv or more was secured, the galling resistance and the phosphating properties were good, and there was no liquid metal embrittlement in welded portions.

It can be seen that the comparative examples 1 and 2 are cases in which the coating adhesion amount of the Zn—Al-based coated layer was too small as 1 g/m² and the phosphating properties were poor.

It can be seen that the comparative examples 3 to 6 are cases in which the content of Al in the Zn—Al-based coated layer was too high as 1.5%, the galling resistance was good because the hardness of the coated layer was high, but the phosphating properties were poor.

It can be seen that the comparative examples 7 to 10 are cases in which the content of Al in the Zn—Al-based coated layer was too low as 0.1%, the hardness of the coated layer was low as 55 Hv or less and the phosphating properties were also poor.

The comparative examples 11 and 12 are cases in which the coating amount of the Zn—Al-based coated layer was too high as 15 g/m², the galling resistance and the phosphating property were good, but liquid metal embrittlement was observed at welded portions.

FIG. 3 is an image obtained by observing surfaces after phosphating in the comparative examples 1 and 5 and the inventive examples 1, 2, and 4 using a scanning electron microscope (SEM). As can be seen from FIG. 3, it could be found in the inventive examples 1, 2, and 4 satisfying the conditions of the present disclosure that the phosphate coverage, the sizes of grains, etc. were similar to those of an existing GI material (reference example) after phosphating, but it could found tin the comparative examples 1 and 5 that phosphate crystals almost did not grow, so a normal phosphate film was not formed.

FIG. 4 shows the result of measuring friction coefficients according to the numbers of times of repeated measurement in the inventive examples 1 to 4 and the comparative examples 8 to 10. As can be seen from FIG. 4, it could be seen that the friction coefficients ware low in the inventive examples 1 to 4 even though the number of times of repeated measurement is 40, but the friction coefficients are rapidly increased over 0.3 when the number of times of repeated measurement is around about 20 in the comparative examples 8 to 10, whereby it is possible to expect they are not suitable as automotive materials.

Although the present invention was described above with reference to exemplary embodiments, it should be understood that the present invention may be changed and modified in various ways by those skilled in the art, without departing from the spirit and scope of the present invention described in claims.

The invention claimed is:
1. An aluminum-based alloy-coated steel sheet including:
   a base steel sheet;
   an Al-based alloy-coated layer formed on at least one surface of the base steel sheet; and
   a Zn—Al-based coated layer, formed on the Al-based alloy-coated layer, including Al: 0.6-1.0%, and a balance of Zn and unavoidable impurities in percentage by weight, and having an adhesion amount of 3-12 g/m$^2$.
2. The aluminum-based alloy-coated steel sheet of claim 1, wherein hardness of the Zn—Al-based coated layer is 65 Hv or more.
3. The aluminum-based alloy-coated steel sheet of claim 1, wherein Al-based alloy-coated layer includes Si: 5-12%, Zn: 5-30%, Mg: 0.5-5%, Mn: 0.01-2%, Fe: 0.1-2%, and Al and unavoidable impurities as the balance in percentage by weight.

* * * * *